US009865292B1

(12) United States Patent
Kiely et al.

(10) Patent No.: US 9,865,292 B1
(45) Date of Patent: Jan. 9, 2018

(54) CONTACT DETECTION USING MODULATED WRITER COIL CURRENT FOR A HEAT-ASSISTED MAGNETIC RECORDING SLIDER

(71) Applicant: Seagate Technology LLC, Cupertino, CA (US)

(72) Inventors: James Dillon Kiely, Edina, MN (US); Neil Zuckerman, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/445,388

(22) Filed: Feb. 28, 2017

(51) Int. Cl.
G11B 5/60 (2006.01)
G11B 5/00 (2006.01)

(52) U.S. Cl.
CPC .......... G11B 5/607 (2013.01); G11B 5/6076 (2013.01); G11B 2005/0021 (2013.01)

(58) Field of Classification Search
CPC ....... G11B 5/31; G11B 5/3133; G11B 5/3146; G11B 5/127; G11B 5/1278; G11B 2005/0024; G11B 5/60; G11B 5/607; G11B 5/6076; G11B 2005/0021
USPC ...... 360/125.1, 125.2, 125.3, 125.31–125.35
See application file for complete search history.

(56) References Cited

U.S. PATENT DOCUMENTS

| 8,848,309 B2 | 9/2014 | Budde | |
|---|---|---|---|
| 8,995,076 B1 | 3/2015 | Olson et al. | |
| 9,117,474 B1 | 8/2015 | Contreras et al. | |
| 2012/0120522 A1* | 5/2012 | Johnson | G11B 5/607 360/75 |
| 2012/0194945 A1 | 8/2012 | Gao | |
| 2014/0254040 A1 | 9/2014 | Liu et al. | |
| 2014/0269819 A1* | 9/2014 | Kiely | G11B 5/3116 374/45 |
| 2015/0036469 A1* | 2/2015 | Johnson | G11B 13/08 369/13.33 |
| 2015/0213813 A1 | 7/2015 | Lammers et al. | |

* cited by examiner

Primary Examiner — Allen T Cao
(74) Attorney, Agent, or Firm — Hollingsworth Davis, LLC

(57) ABSTRACT

A slider having an air bearing surface is configured for heat-assisted magnetic recording. A writer of the slider comprises a writer coil. A current source is configured to supply a modulated writer current at a first predetermined frequency to the writer coil. A writer heater is situated proximate the writer and configured to thermally actuate a writer region of the air bearing surface. A contact sensor is situated proximate the writer coil and configured to sense temperature changes indicative of changes in spacing and contact between the slider and a magnetic recording medium. A signal produced by the contact sensor oscillates at the first predetermined frequency. A detector is coupled to the contact sensor. The detector is configured to detect contact between the thermally actuated writer region and the medium using the contact sensor signal.

20 Claims, 12 Drawing Sheets

CONTACT DETECTION USING MODULATED WRITER COIL CURRENT FOR A HEAT-ASSISTED MAGNETIC RECORDING SLIDER

SUMMARY

Embodiments of the disclosure are directed to an apparatus comprising a slider having an air bearing surface and configured for heat-assisted magnetic recording. A writer of the slider comprises a writer coil. A current source is configured to supply a modulated writer current at a first predetermined frequency to the writer coil. A writer heater is situated proximate the writer and configured to thermally actuate a writer region of the air bearing surface. A contact sensor is situated proximate the writer coil and configured to sense temperature changes indicative of changes in spacing and contact between the slider and a magnetic recording medium. A signal produced by the contact sensor oscillates at the first predetermined frequency. A detector is coupled to the contact sensor. The detector is configured to detect contact between the thermally actuated writer region and the medium using the contact sensor signal.

Other embodiments are directed to an apparatus comprising a slider having an air bearing surface and configured for heat-assisted magnetic recording. A writer of the slider comprises a writer coil. A current source is configured to supply a modulated writer current at a first predetermined frequency to the writer coil. A laser diode is optically coupled to a near-field transducer proximate the writer via an optical waveguide. A current source is configured to supply a modulated laser current at the first predetermined frequency to the laser diode. A writer heater is situated proximate the writer and configured to thermally actuate a writer region of the air bearing surface. A contact sensor is situated proximate the writer coil and configured to sense temperature changes indicative of changes in spacing and contact between the slider and a magnetic recording medium. A signal produced by the contact sensor oscillates at the first predetermined frequency. A detector is coupled to the contact sensor. The detector is configured to detect contact between the thermally actuated writer region and the medium using the contact sensor signal.

Further embodiments are directed to a method involving providing relative movement between a magnetic recording medium and a slider configured for heat-assisted magnetic recording. The slider comprises an air bearing surface, a writer including a writer coil, a writer heater, and a contact sensor. The method involves supplying modulated current at a first predetermined frequency to the writer coil and heating the contact sensor in response to the modulated current. The method also involves increasing power supplied to the writer heater while supplying the modulated current to the writer coil to cause a protruded portion of the air bearing surface to move toward the medium. The method further involves producing, by the contact sensor, a sensor signal that oscillates at the first predetermined frequency. The method also involves detecting contact between the protruded portion of the protruded portion of the air bearing surface and the medium using the contact sensor signal.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
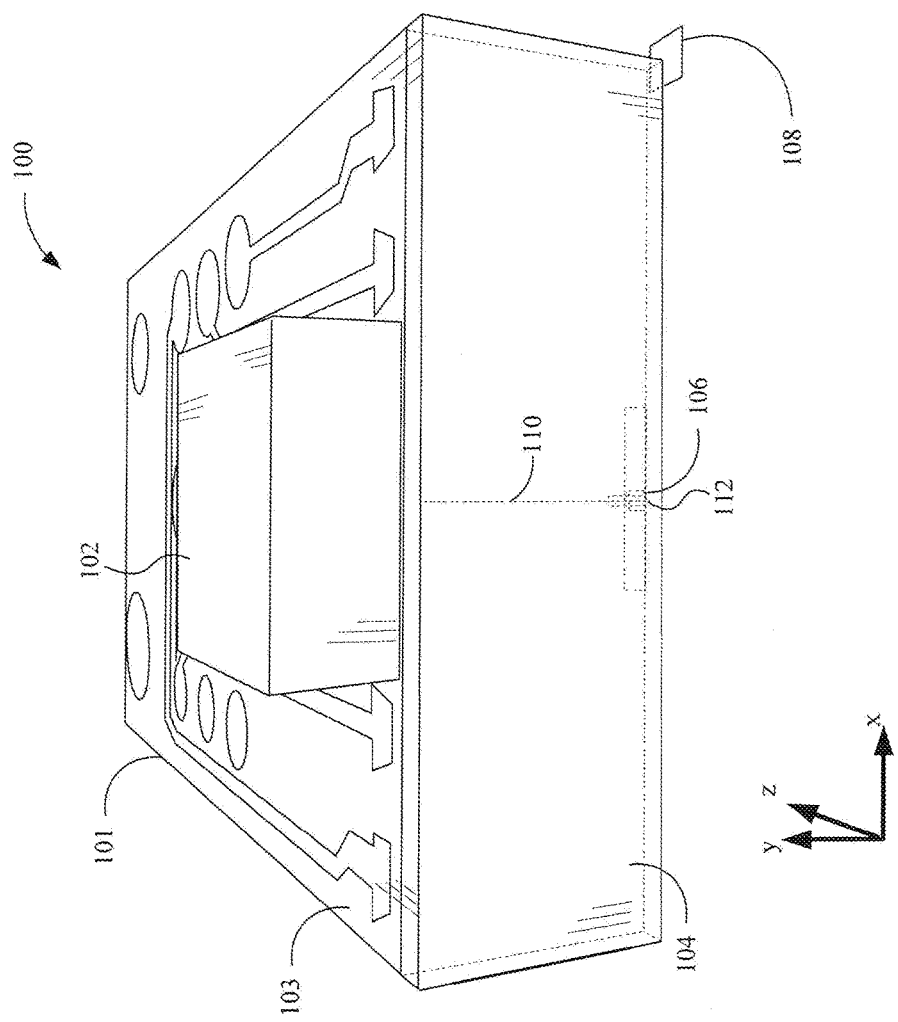
FIG. 1 is a perspective view of a HAMR slider assembly according to a representative embodiment.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide system 110, are formed integrally within the slider body 101 (near a trailing edge surface 104 in this example) and function as an optical path that delivers energy from the laser diode 102 to the recording media via an NFT 112. The NFT 112 is near the writer of the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
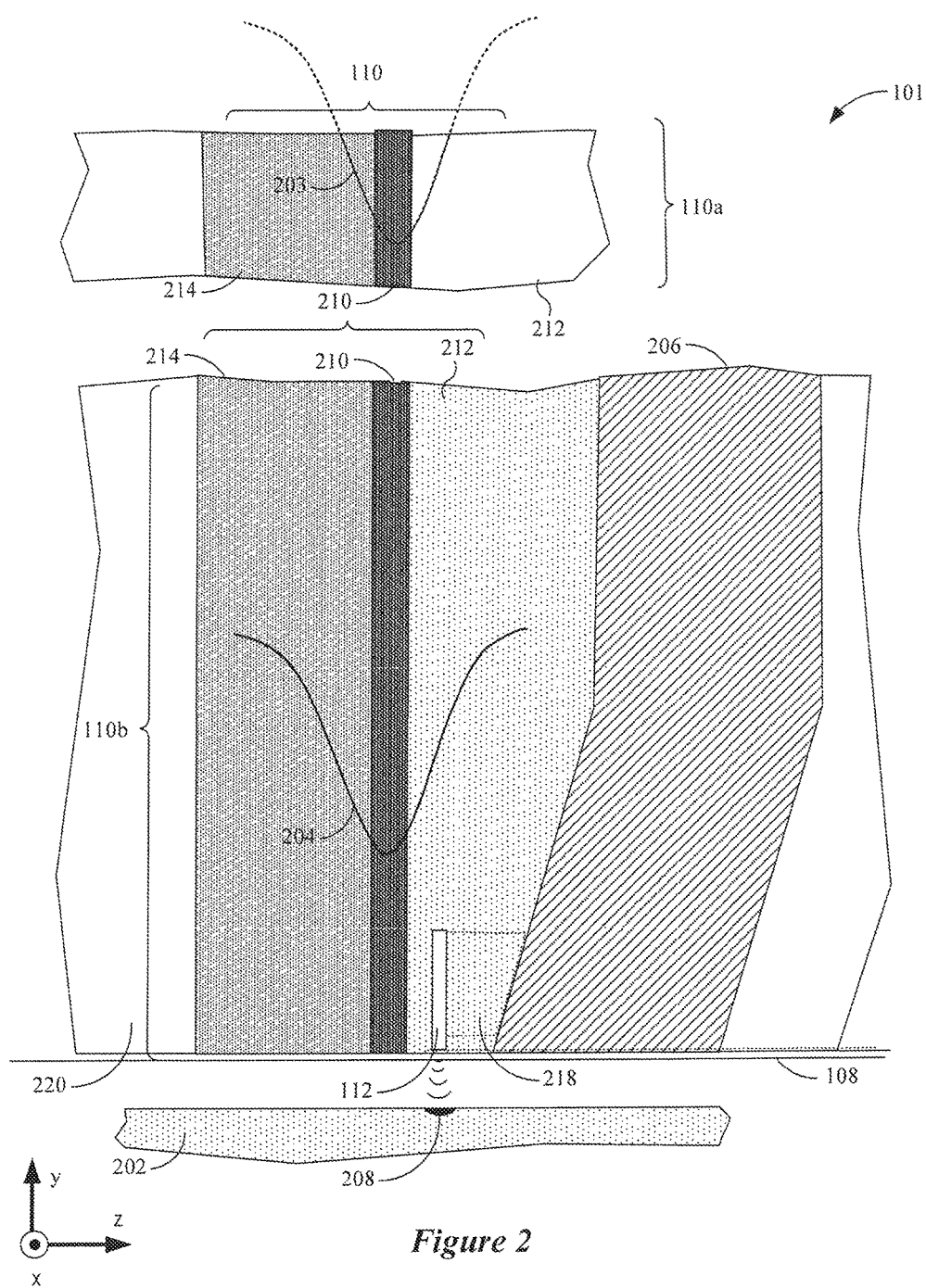
FIG. 2 is a cross-sectional view of portions of a slider body near a writer according to a representative embodiment.

In FIG. 2, a cross-sectional view illustrates portions of the slider body 101 near the NFT 112 according to a representative embodiment. In this view, the NFT 112 is shown proximate to a surface of a magnetic recording medium 202, e.g., a magnetic disk. The waveguide system 110 delivers electromagnetic energy to the NFT 112, which directs the energy to create a small hotspot 208 on the recording medium 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

According to some embodiments, the waveguide system 110 includes a first portion 110a configured to receive light 203 from a light source (e.g., laser 102 in FIG. 2) at a fundamental transverse electric (TE) mode (e.g., TE00). The first portion 110a may include at least a three-dimensional waveguide extending along the light propagation direction (negative y-direction). The waveguide system 110 also includes a second portion 110b that outputs light 204 to an output region of the waveguide near the NFT 112 at a higher-order TE mode (e.g., TE10). A mode order converter can be integrated in the first or second portions 110a and 110b. Alternatively, the dimensions and relative orientation of the portions 110a-b can be selected to achieve the mode conversion of light propagated to the NFT 112. The NFT 112 receives the light 204 at the higher-order mode and generates surface plasmons that heat the magnetic recording medium 202. The NFT 112 may include or be coupled to a heat sink 218 that extends to the write pole 206.

The waveguide portions 110a-b are formed via a layer of core material 210 surrounded by cladding layers 212 and 214. The core layer 210 and cladding layers 212, 214 may be made from dielectric materials such as Al2O3, SiOxNy, SiO2, Ta2O5, TiO2, ZnS, SiNx, Nb2O5, AlN, Hf2O3, Y2O3, etc. Generally, the dielectric materials are selected so that the refractive index of the core layer 210 is higher than refractive indices of the cladding layers 212 and 214. This arrangement of materials facilitates efficient propagation of light through the waveguide system 110.

Obtaining accurate clearance measurements is important when calibrating write clearance of a HAMR slider. Write clearance measurements are made when the close point of the writer of a slider contacts the surface of a magnetic recording medium. The accuracy of clearance measurements relies on the ability to accurately detect contact between the close point of the slider and the recording medium. HAMR drives typically have a low- or non-modulation head-disk interface (HDI) in which the air bearing is relatively stiff. The relatively stiff air bearing makes it challenging to detect head-medium contact events using conventional techniques.

Embodiments of the disclosure are directed to detecting contact between a slider and a recording medium using modulated writer coil current. Embodiments are directed to heating a contact sensor of the slider using modulated writer coil current to enhance detection of a modulated sensor signal produced by the contact sensor indicative of contact between the slider and the medium.

According to various embodiments, the contact sensor can be configured as a thermal sensor. For example, the contact sensor may comprise a resistive sensing element (e.g., a wire) having a high thermal coefficient of resistance (TCR). Such resistive sensing elements experience a change in resistance in response to a change in temperature. A suitable resistive contact sensor is a dual-ended TCR sensor (DETCR). Other types of thermal sensors can be used, such as a thermocouple or a thermistor.

Figure 3:
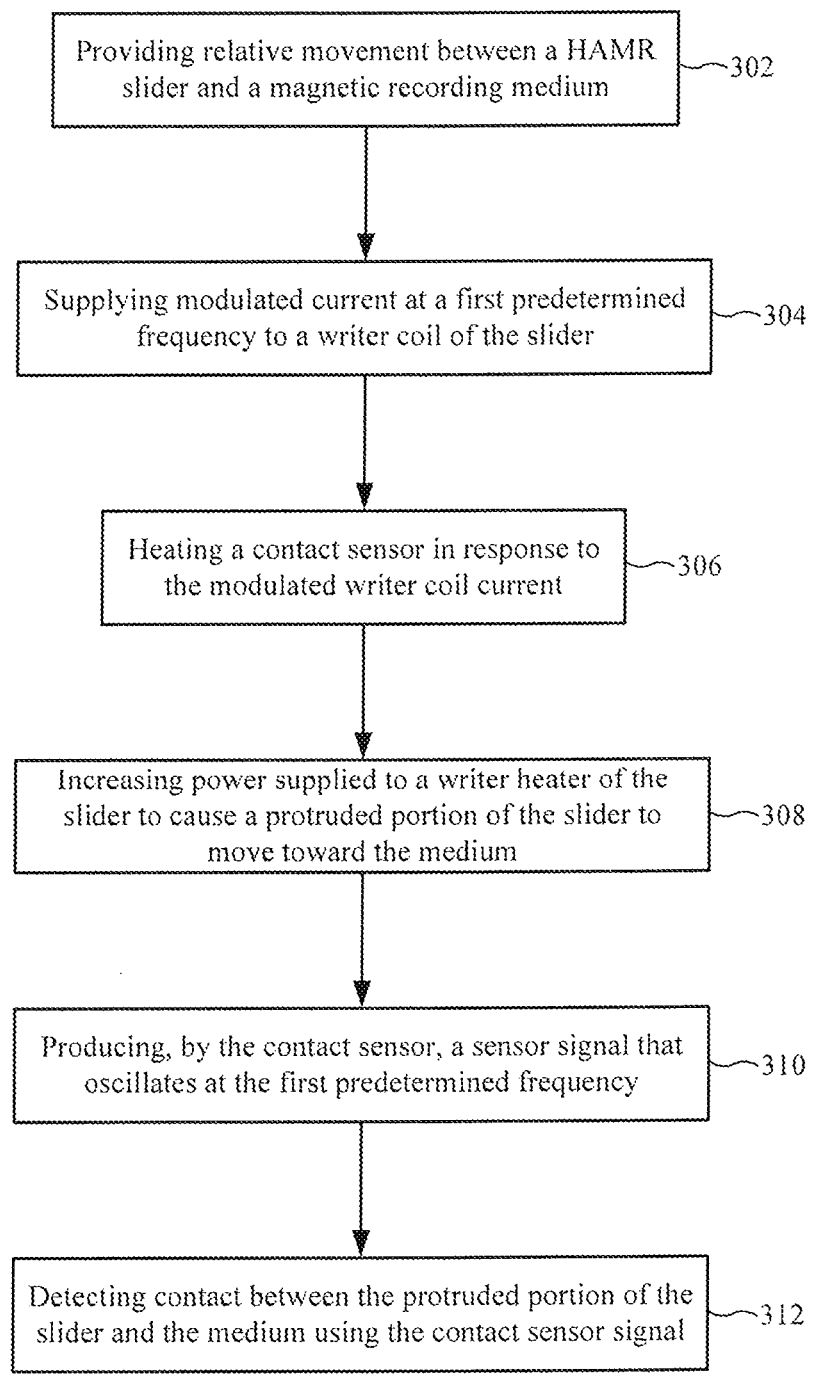
FIG. 3 is a flow diagram illustrating a contact detection method using modulated writer coil current in accordance with various embodiments.

FIG. 3 is a flow diagram illustrating a contact detection method using modulated writer coil current in accordance with various embodiments. The method shown in FIG. 3 involves providing 302 relative movement between a HAMR slider and a magnetic recording medium. The method involves supplying 304 modulated current at a first predetermined frequency to a writer coil of the slider. Supplying modulated current to the writer coil causes heating 306 of a contact sensor of the slider. The method also involves increasing 308 power supplied to a writer heater of the slider to cause a protruded portion of the slider to move toward the medium. The method involves producing 310, by the contact sensor, a sensor signal that oscillates at the first predetermined frequency. The method further involves detecting 312 contact between the protruded portion of the slider and the medium using the contact sensor signal.

Figure 4:
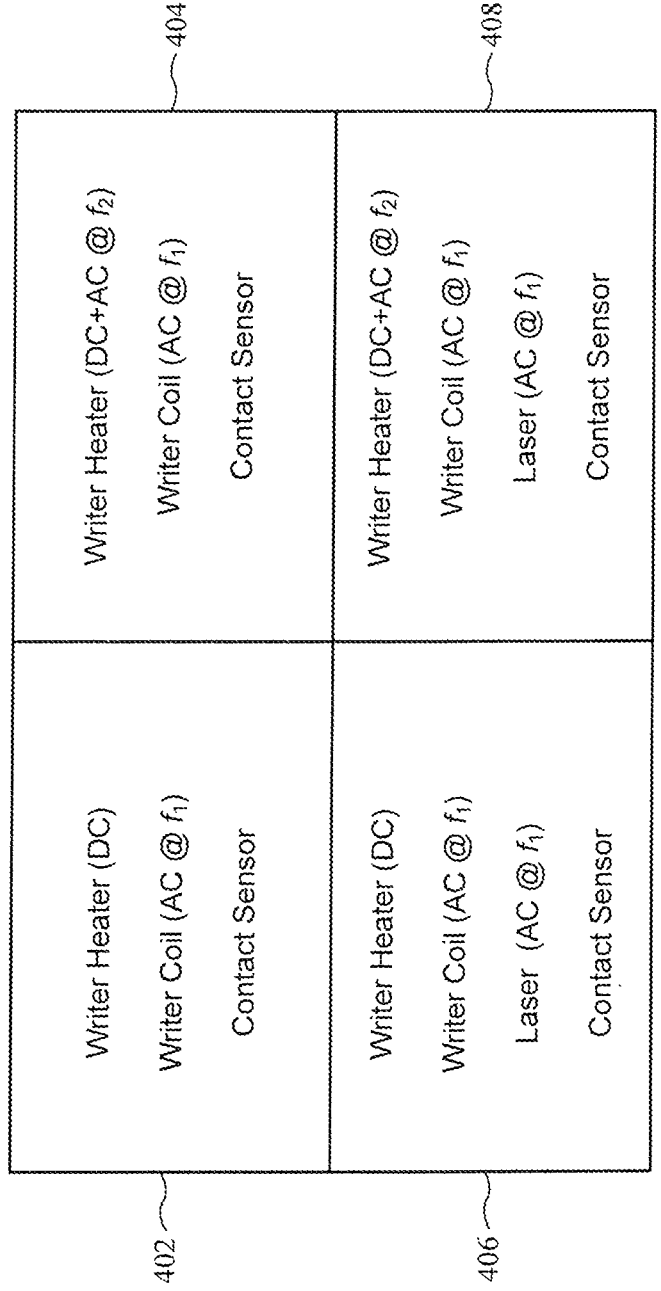
FIG. 4 shows different scenarios for performing contact detection using modulated writer coil current in accordance with various embodiments.

FIG. 4 shows different scenarios for performing contact detection using modulated writer coil current in accordance with various embodiments. A contact detection procedure using modulated writer coil current described herein is referred to as a high-frequency AC writer (HFACW) contact detection technique. Contact detection procedures, such as one used for setting clearance, involve thermally actuating the writer of a slider using a writer heater. Some contact detection procedures involve supplying low-frequency AC power to the writer heater, which is commonly referred to as a low-frequency AC heater (LFACH) contact detection procedure.

Embodiments of the present disclosure involve thermally actuating the writer using the writer heater in combination with energizing the writer using modulated writer coil current. According to some HFACW contact detection procedures, as shown in scenario 402, DC power is supplied to the writer heater concurrently with AC current supplied to the writer coil at a first predetermined frequency, $f_1$. The first predetermined frequency, $f_1$, can range between about 1 kHz and 5 MHz, such as between about 5 kHz and 200 kHz (e.g., 40 kHz at 10% modulation). A modulated response of a contact sensor at the first predetermined frequency, $f_1$, is monitored to detect head-medium contact.

According to other HFACW contact detection procedures, as shown in scenario 404, DC and AC power at a second predetermined frequency, $f_2$, is supplied to the writer heater concurrently with AC current supplied to the writer coil at the first predetermined frequency, $f_1$. The second predetermined frequency, $f_2$, is typically a frequency in the range of about 0.5 kHz to about 5 kHz. A modulated response of a contact sensor at the first predetermined frequency, $f_1$, is monitored to detect head-medium contact. A contact detection procedure according to scenario 404 represents a combined HFACW and LFACH contact detection procedure.

According to further HFACW contact detection embodiments, as shown in scenarios 406 and 408, a laser diode that supplies light to the NFT of the slider is activated during the contact detection procedure. According to some HFACW contact detection procedures, as shown in scenario 406, DC power is supplied to the writer heater concurrently with AC current supplied to the writer coil at the predetermined frequency, $f_1$. In other HFACW contact detection procedures, as shown in scenario 408, DC and AC power at the second predetermined frequency, $f_2$, is supplied to the writer heater concurrently with AC current supplied to the writer coil at the predetermined frequency, $f_1$. In addition, and concurrently, AC laser current is supplied to the laser diode at the predetermined frequency, $f_1$. A modulated response of a contact sensor at the first predetermined frequency, $f_1$, is monitored to detect head-medium contact. Activating the laser diode during contact detection serves to provide additional heat to the contact sensor, which increases the sensitivity of the contact sensor for detecting head-medium contact events. It is noted that the laser diode can be energized at a level that does not disturb data recorded on the magnetic recording medium.

Figure 5:
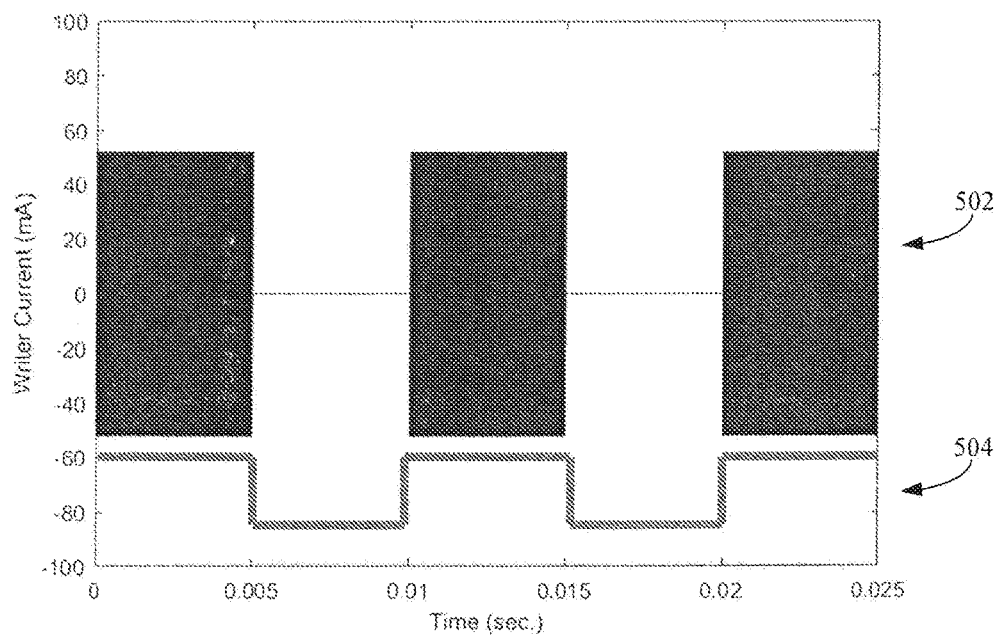
FIG. 5 is a graph showing writer coil current and heater power during a normal write operations involving a low-frequency AC heater (LFACH) contact detection procedure.
Figure 6:
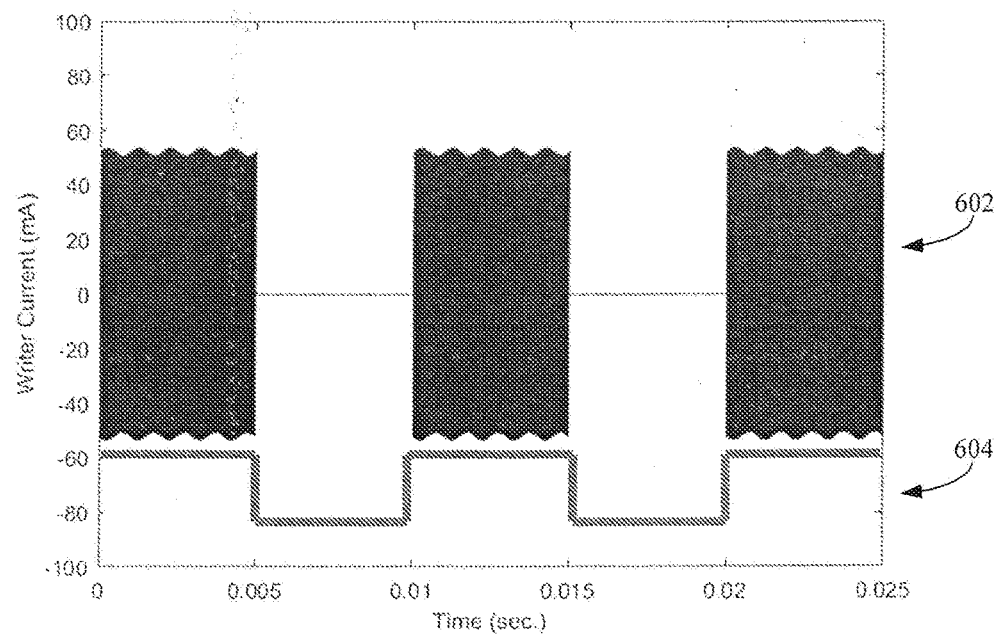
FIG. 6 is a graph showing modulated writer coil current and heater power during write operations involving a high-frequency AC writer (HFACW) contact detection procedure in accordance with various embodiments.

FIG. 5 is a graph showing writer coil current 502 and heater power 504 during a normal write operations involving LFACH contact detection. As can be seen in FIG. 5, the amplitude of the writer coil current 502 is constant. For example, the writer coil current 502 may have an amplitude of about 55 mA at a write frequency ranging between about 500 to 1000 MHz. It is noted that the write frequency is determined by the data rate of the hard drive. FIG. 6 is a graph showing modulated writer coil current 602 and heater power 604 during write operations involving HFACW in accordance with various embodiments. FIG. 6 illustrates a contact detection procedure that combines HFACW and LFACH techniques. As can be seen in FIG. 6, the writer coil current 602 is modulated. For example, the writer coil current 602 can have a modulation of about 5% to 10%. As was discussed previously, AC current supplied to the writer coil can have a frequency ranging between about 1 kHz and about 5 MHz (e.g., between about 5 kHz and 200 kHz).

Figure 7:
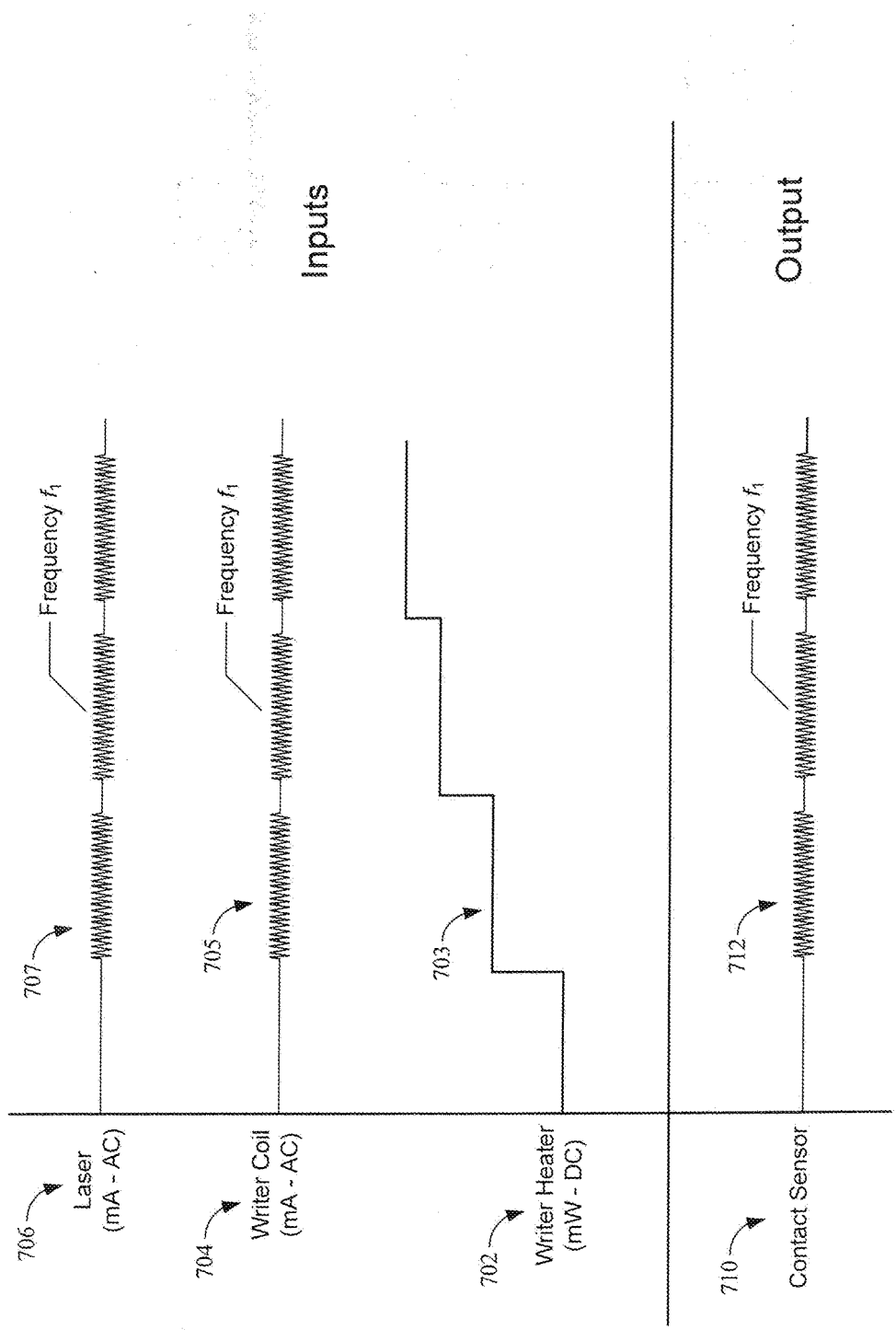
FIG. 7 shows waveforms of various components of a heat-assisted magnetic recording (HAMR) slider that can be used to perform HFACW contact detection in accordance with various embodiments.

FIG. 7 shows waveforms of various components of a HAMR slider that can be used to perform HFACW contact detection in accordance with various embodiments. In some embodiments, the writer heater 702, writer coil 704, and contact sensor 710 are used to implement HFACW contact detection (see scenarios 402 and 404 in FIG. 4). In other embodiments, the writer heater 702, writer coil 704, laser diode 706, and contact sensor 710 are used to implement HFACW contact detection (see scenarios 406 and 408 in FIG. 4).

Performing HFACW contact detection according to FIG. 7 involves thermally actuating the writer of a HAMR slider using the writer heater 702. DC power is supplied to the writer heater 702 and incrementally increased to decrease head-medium spacing between the slider and the surface of a magnetic recording medium. At each increment 703 of DC power supplied to the writer heater 702, current 705 supplied to the writer coil 704 is modulated at a first predetermined frequency, $f_1$. In FIG. 7, the amplitude of the writer coil current 705 is constant. It is understood that the amplitude of the writer coil current 705 can be varied. In some embodiments, current 707 supplied to the laser diode 706 is modulated at the first predetermined frequency, $f_1$, during the contact detection procedure.

The modulated writer coil current 705 and modulated laser current 707 (if present) induces modulation in the response 712 of the contact sensor 710 as the slider incrementally moves towards the recording medium by application of DC power to the writer heater 702. It is noted that modulation of the writer coil current 705 does not need to induce physical displacement (modulation) of the slider, but does induce a temperature modulation at the contact sensor 710. The contact sensor 710 is subject to cooling as it moves closer to the recording medium. When the contact sensor 710 physically contacts the recording medium, frictional heating of the contact sensor 710 occurs which results in a disturbance (e.g., inflection) in the contact sensor response 712. A detector can lock to the frequency, $f_1$, of the contact sensor signal 712 to provide a high signal-to-noise ratio (SNR) output from the contact sensor 710. The detector can detect the disturbance in the contact sensor response 712 indicative of contact between the slider and the recording medium.

Figure 8:
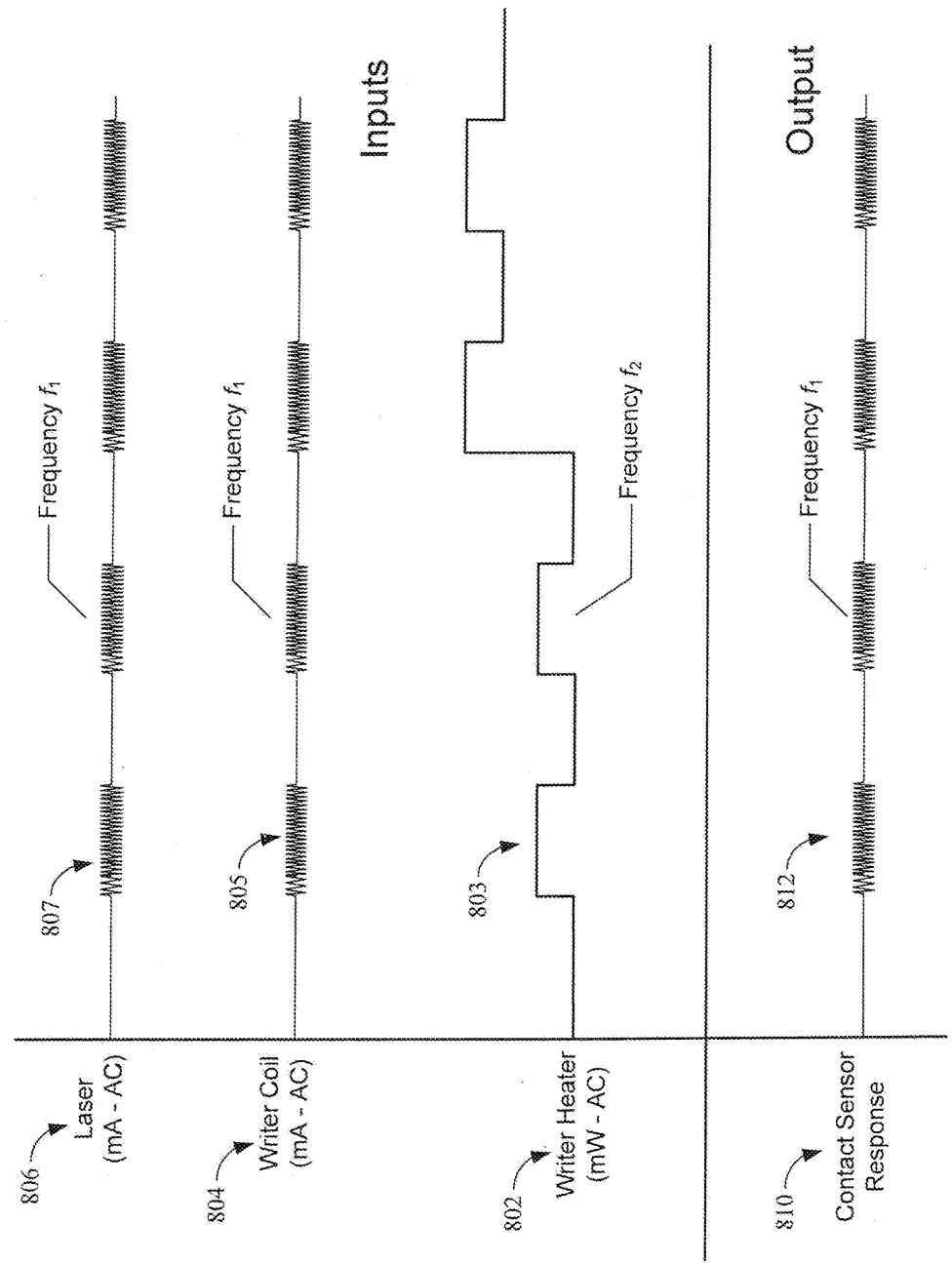
FIG. 8 shows waveforms of various components of a HAMR slider that can be used to perform HFACW contact detection in accordance with various embodiments.

FIG. 8 shows waveforms of various components of a HAMR slider that can be used to perform HFACW contact detection in accordance with various embodiments. In some embodiments, the writer heater 802, writer coil 804, and contact sensor 810 are used to implement HFACW contact detection (see scenarios 402 and 404 in FIG. 4). In other embodiments, the writer heater 802, writer coil 804, laser diode 806, and contact sensor 810 are used to implement HFACW contact detection (see scenarios 406 and 408 in FIG. 4).

Performing HFACW contact detection according to FIG. 8 involves thermally actuating the writer of a HAMR slider using the writer heater 802. DC and AC power at a second predetermined frequency, $f_2$, is supplied to the writer heater 802 according to an LFACH technique. The DC power supplied to the writer heater 802 is incrementally increased to decrease head-medium spacing between the slider and the surface of a magnetic recording medium. As DC and AC power 803 is supplied to the writer heater 802, current 805 supplied to the writer coil 804 is modulated at a first predetermined frequency, $f_1$.

In FIG. 8, the amplitude of the writer coil current 805 is constant, but can be varied as previously discussed. In some embodiments, current 807 supplied to the laser diode 806 is modulated at the first predetermined frequency, $f_1$, during the contact detection procedure. As in the embodiment shown in FIG. 7, when the contact sensor 810 physically contacts the recording medium, frictional heating of the contact sensor 810 occurs which results in a disturbance (e.g., inflection) in the contact sensor response 812. A detector can lock to the frequency, $f_1$, of the contact sensor signal 812 to provide a high SNR output from the contact sensor 810. The detector can detect the disturbance in the contact sensor response 812 indicative of contact between the slider and the recording medium.

Performing contact detection using modulated writer coil current provides a number of advantages over contact detection techniques that rely solely on a writer heater. Performing contact detection using modulated writer coil current results in heating the contact sensor above a temperature achievable using a non-modulated writer coil current. Additional heating of the contact sensor can be achieved by activating the laser diode of the HAMR device. Heating the contact sensor using the modulated writer coil current alone or in combination with modulated laser light allows the contact sensor to experience more cooling as the contact sensor approaches the recording medium, which increases the sensitivity of the contact sensor. Heating the contact sensor using modulated writer coil current is more effective than heating the sensor using the writer heater, which is located considerably farther away from the contact sensor than the writer coil.

It is desirable to minimally or negligibly change slider clearance when heating the contact sensor using modulated writer coil current. It was found that the protrusion at the writer due to modulated writer coil current heating is much smaller than that due to the writer heater near the point of head-medium contact. For example, experiments showed a negligible writer induced writer protrusion (WIWP) of less than 0.2 nm (e.g., about 0.1 nm) using a 10% modulated writer coil current of about 2 mA. Moreover, the slope of the WIWP was found to be greater than the slope of the heater induced writer protrusion (HIWP), making the air bearing response stronger per milliwatt input.

Using modulated writer coil current allows for much greater precision in controlling and timing the additional heat communicated to the contact sensor in comparison to heating by the writer heater. Moreover, writer current controls are independent of the writer heater, and can be simultaneous with any write operation. The independence of writer current control isolates the writer current from potential disturbances that would be caused by sharing a ground connection, as the writer heater does. Also, the time constants for heating the contact sensor using modulated writer coil current are significantly faster than writer heater heating.

Figure 9:
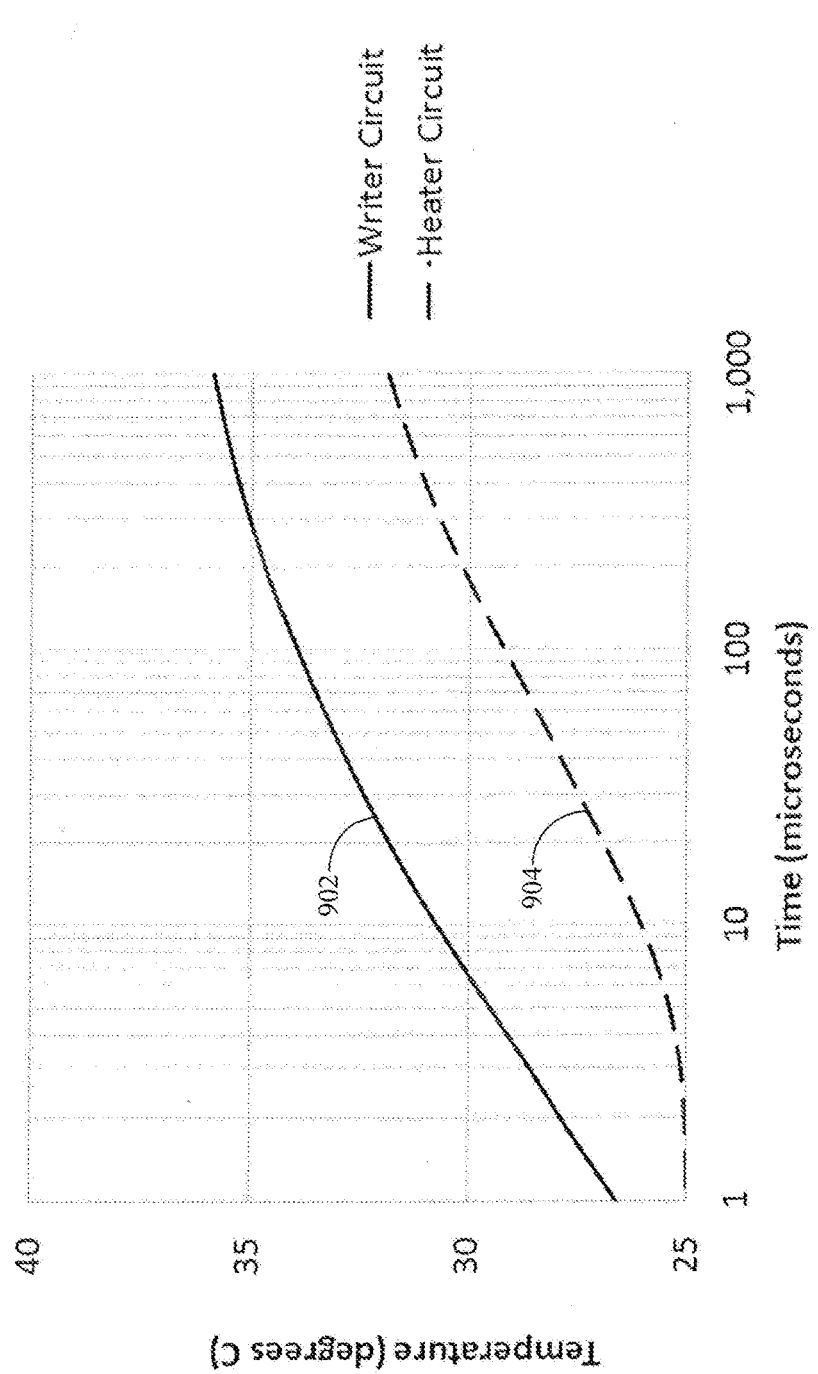
FIG. 9 shows a temperature time history of a contact sensor following activation of a slider's writer coil circuit and writer heater circuit in accordance with various embodiments.

FIG. 9 shows a temperature time history of a contact sensor following activation of a slider's writer coil circuit and writer heater circuit in accordance with various embodiments. Modeling produced the data shown in FIG. 9, in which the writer coil circuit was switched on at 10 mW and the temperature of the contact sensor was measured over a duration of time. The change in contact sensor temperature in response to writer coil circuit heating is shown as curve 902. In the modeling, the writer heater circuit was also switched on at 10 mW and the temperature of the contact sensor was measured over the same duration of time. The change in contact sensor temperature in response to writer heater heating is shown as curve 904. The data shown in FIG. 9 demonstrates that the writer coil circuit is more effective in heating the contact sensor than the writer heater circuit. More particularly, heating the contact sensor using the writer coil circuit provides larger and faster heating of the contact sensor as compared to the writer heater circuit.

Figure 10:
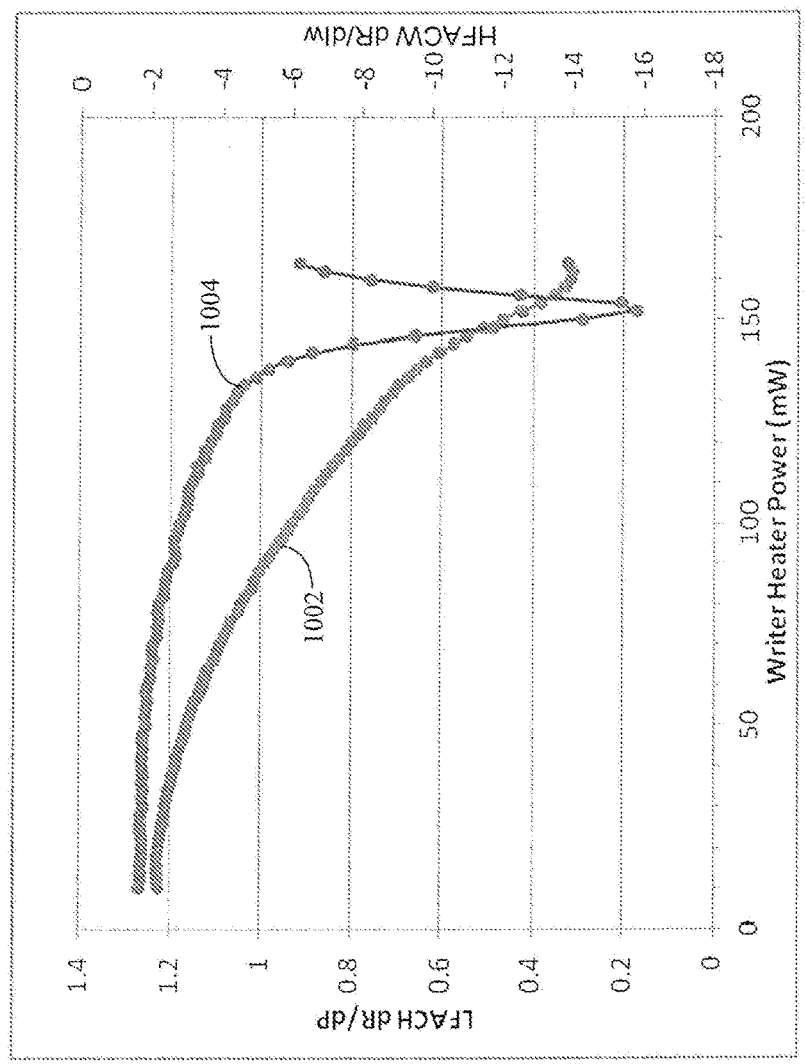
FIG. 10 shows contact sensor response curves acquired during contact detection using a standard LFACH technique and an HFACW technique in accordance with various embodiments.

FIG. 10 shows contact sensor response curves acquired during contact detection using a standard LFACH technique and an HFACW technique in accordance with various embodiments. The response curve 1002 shows the response of the contact sensor during contact detection using the LFACH technique. The response curve 1004 shows the response of the contact sensor during contact detection using the HFACW technique. It is noted that, for the HFACW technique, the writer coil current had an amplitude of 55 mA, a frequency of 40 kHz, and a 10% modulation. It can be seen in FIG. 10 that the response curve 1002 has a rather small inflection point at around 160 mW (writer heater power) indicative of contact between the slider and the recording medium. In contrast, the response curve 1004 has a prominent inflection point at around 150 mW of writer heater power which unambiguously indicates contact between the slider and the recording medium. FIG. 10 demonstrates that the contact sensor (e.g., a DETCR) shows very high sensitivity during contact detection using an HFACW technique.

Figure 11:
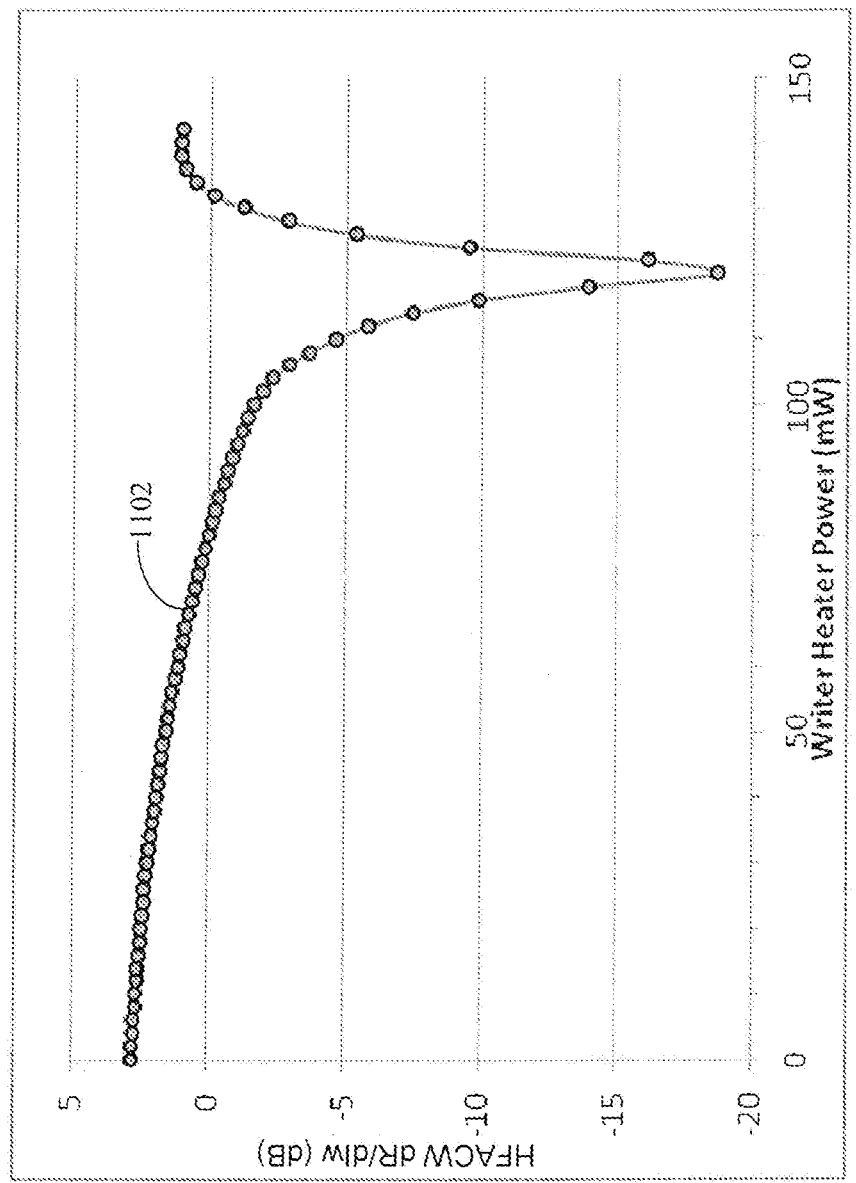
FIG. 11 shows a contact response curve acquired during contact detection using an HFACW technique in accordance with various embodiments.

FIG. 11 shows a contact response curve acquired during contact detection using an HFACW technique in accordance with various embodiments. Response curve 1102 shows the response of the contact sensor during contact detection using the HFACW technique without heater modulation (a non-LFACH technique). In this case, the writer heater was not modulated, only ramped using 2 mW steps until contact was detected. In this experiment, the writer coil current had an amplitude of 55 mA, a frequency of 2 kHz, and a 10% modulation. A prominent inflection point in the response curve 1102 occurs at around 120 mW of writer heater power, thereby providing an unambiguous indication of head-medium contact. FIG. 11 demonstrates that an HFACW contact detection technique is highly effective in detecting head-medium contact, either with or without writer heater modulation.

Figure 12:
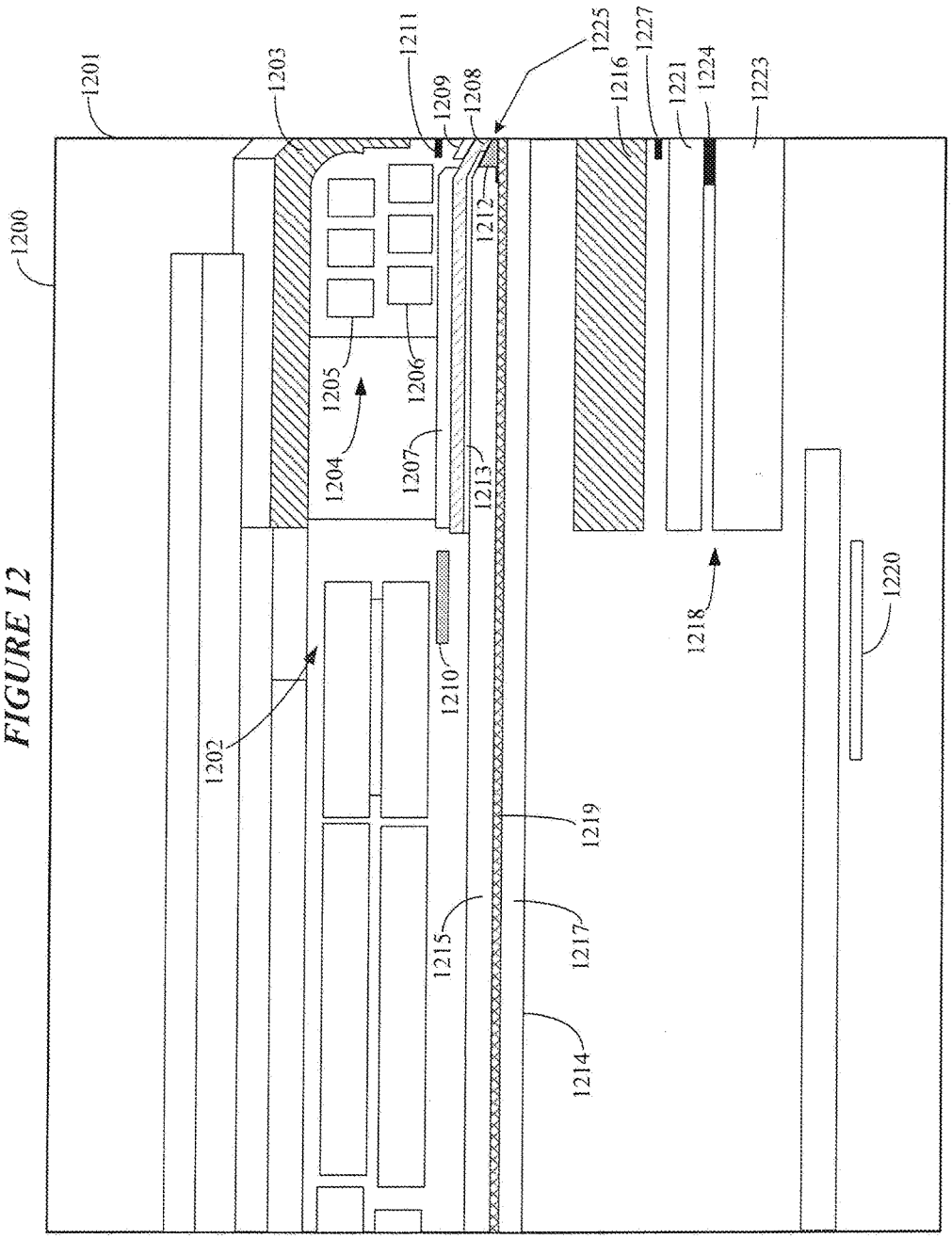
FIG. 12 shows a portion of a HAMR slider with which embodiments of the present disclosure can be implemented.

FIG. 12 shows a portion of a HAMR slider with which embodiments of the present disclosure can be implemented. The portion of the slider 1200 shown in FIG. 12 includes a number of components at or near an air bearing surface (ABS) 1201 of the slider 1200. A writer 1202 of the slider 1200 includes a number of components, including a second return pole 1203 proximate a write coil 1204. The write coil 1204 includes an upper coil 1205 and a lower coil 1206. It is understood that the write coil 1204 may conform to any writer coil design, including a double-pancake design, single-layer pancake design, or a helical coil design, for example.

The write coil 1204 is configured to energize a write pole 1208 of the slider 1200. A magnetic yoke 1207 is disposed between the write coil 1204 and the write pole 1208. A write pole heat sink 1209 is thermally coupled to the write pole 1208. A writer heater 1210 is positioned proximate the write pole 1208 and is configured to thermally actuate the write pole 1208 during write operations. An NFT 1212 is situated proximate the write pole 1208 and is optically coupled to an optical waveguide 1214. The waveguide 1214 includes an upper cladding layer 1215, a lower cladding layer 1217, and a core 1219 between the upper and lower cladding layers 1215 and 1217. A diffuser 1213 thermally couples to the NFT 1212 and extends between at least a portion of the write pole 1208 and the upper cladding layer 1215. The writer 1202 also includes a first return pole 1216, which is magnetically coupled to the write pole 1208 and the second return pole 1204. The slider 1200 shown in FIG. 12 also includes a reader 1218. The reader 1218 includes a read element (e.g., a GMR sensor) disposed between a pair of reader shields 1221 and 1223. A reader heater 1220 is located proximate the reader 1218, which is configured to thermally actuate the reader 1218 during read operations.

A contact sensor 1211 is shown positioned at or near the ABS 1201 near the write coil 1204. More particularly, the contact sensor 1211 is positioned proximate the write coil 1204 and the write pole 1208. At this location, the contact sensor 1211 is arranged to detect contact between a close point of the writer 1202 (when thermally actuated by the writer heater 1210) and a magnetic recording medium. At this location, the contact sensor 1211 is heated by modulated current supplied to the write coil 1204, which increases its sensitivity as previously discussed. For example, the contact sensor 1211 can be located about 1 µm or less from the write coil 1204. The slider 1200 also includes a contact sensor 1227 positioned proximate the reader 1218. The contact sensor 1227 is arranged to detect contact between a close point of the reader 1218 (when thermally actuated by the reader heater 1220) and the recording medium. In some embodiments, the writer contact sensor 1211 is coupled (in series or in parallel) to the reader contact sensor 1227. In other embodiments, the writer and reader contact sensors 1211 and 1227 are independent of each other.

Figure 13:
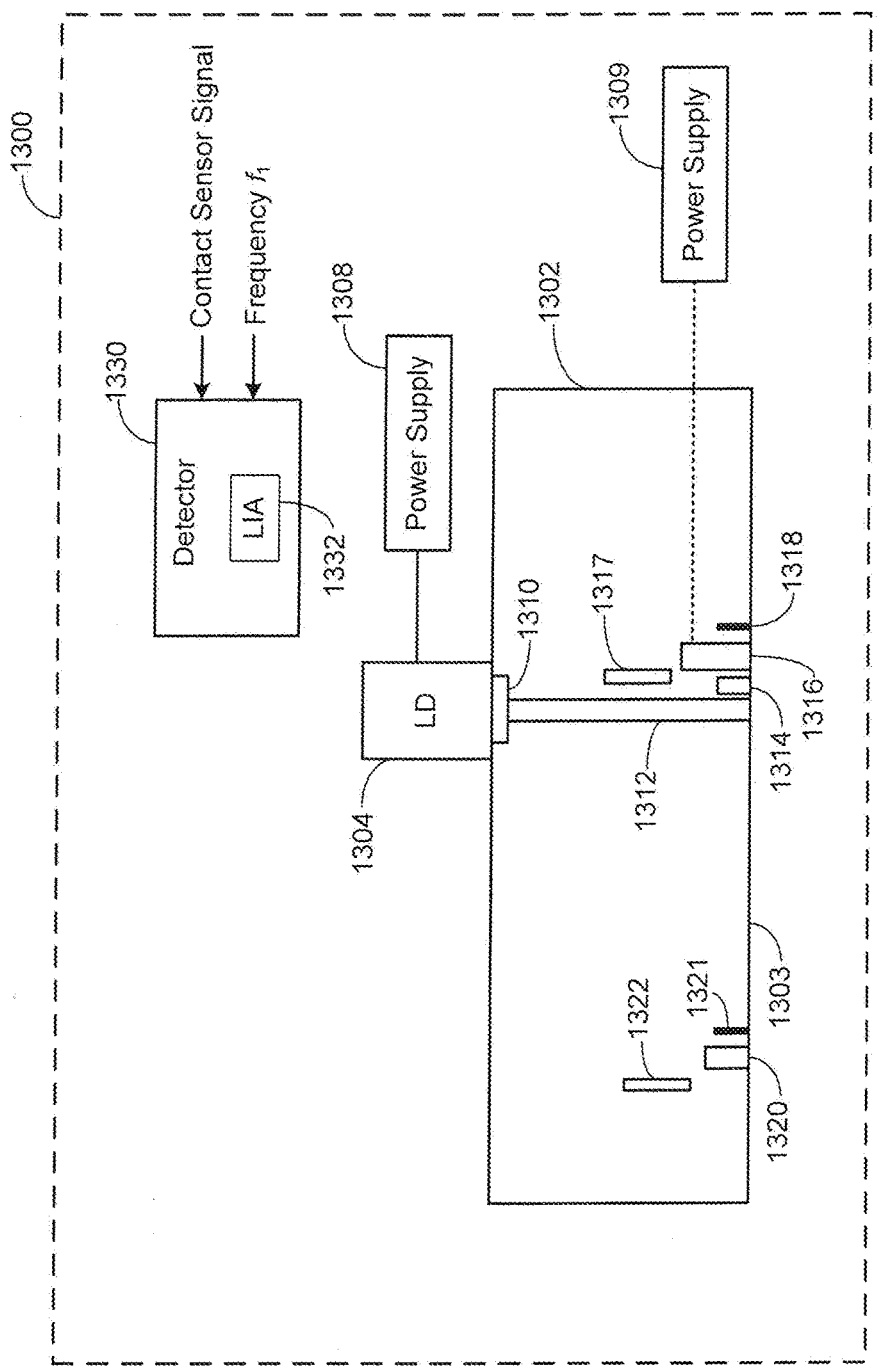
FIG. 13 is a block diagram of a system for performing contact detection using modulated writer coil current in a HAMR drive in accordance with various embodiments.

FIG. 13 is a block diagram of a system for performing contact detection using modulated writer coil current in a HAMR drive in accordance with various embodiments. A slider 1302 of the HAMR drive 1300 includes a number of components including an optical waveguide 1312 which is optically coupled to a laser diode 1304 via an optical coupler 1310. The optical waveguide 1312 extends from the optical coupler 1310 to an NFT 1314 situated at an air bearing surface 1303 proximate the optical waveguide 1312. A writer 1316 is situated proximate the NFT 1314. A writer heater 1317 is situated proximate the writer 1316 and configured to thermally actuate the writer 1316. A contact sensor 1318 is situated proximate the writer 1316 and NFT 1314 (e.g., at or near a close point of the writer 1316). A reader 1320 is shown positioned away from the writer 1316. A reader heater 1322 and a contact sensor 1321 are situated proximate the reader 1320.

A power supply 1308 is coupled to the laser diode 1304 and provides current to the laser diode 1304. In some embodiments, the power supply 1308 provides modulated current to the laser diode 1304 (e.g., at the first predetermined frequency, $f_1$) as previously discussed. A power supply 1309 is coupled to the writer 1316 and provides modulated current to the coil of the writer 1316 (e.g., at the first predetermined frequency, $f_1$) as previously discussed.

A detector 1330 is coupled to the contact sensor 1318 and receives a modulated response signal at the first predetermined frequency, $f_1$, from the contact sensor 1318. The detector 1330 is configured to lock to the frequency, $f_1$, of the modulated response signal received from the contact sensor 1318. The detector 1330 can include a lock-in amplifier 1332 configured to extract signal content from the modulated response signal produced by the contact sensor 1318. The detector 1330 operates on the extracted signal content from the contact sensor 1318 to detect head-medium content. The detector 1330 can be configured to implement other techniques to demodulate the modulated response signal received from the 1318 in order to detect head-medium content.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:
1. An apparatus, comprising:
a slider configured for heat-assisted magnetic recording and comprising an air bearing surface;
a writer comprising a writer coil provided on the slider;
a current source configured to supply a modulated writer current at a first predetermined frequency to the writer coil;
a writer heater proximate the writer and configured to thermally actuate a writer region of the air bearing surface;

a contact sensor proximate the writer coil and configured to sense temperature changes indicative of changes in spacing and contact between the slider and a magnetic recording medium, a signal produced by the contact sensor oscillating at the first predetermined frequency; and a detector coupled to the contact sensor and configured to detect contact between the thermally actuated writer region and the medium using the contact sensor signal.

2. The apparatus of claim 1, wherein the first predetermined frequency is between about 1 kHz and 5 MHz.

3. The apparatus of claim 1, wherein the first predetermined frequency is between about 5 kHz and 200 kHz.

4. The apparatus of claim 1, wherein the writer current modulation is about 10 percent or less.

5. The apparatus of claim 1, wherein a power supplied to the writer heater is DC power.

6. The apparatus of claim 1, wherein a power supplied to the writer heater is DC power and AC power having a second predetermined frequency in the range of about 0.5 kHz to about 5 kHz.

7. The apparatus of claim 1, wherein the modulated writer current causes heating of the contact sensor above a temperature achievable using a non-modulated writer current.

8. An apparatus, comprising:
a slider configured for heat-assisted magnetic recording and comprising an air bearing surface;
a writer comprising a writer coil provided on the slider;
a first current source configured to supply a modulated writer current at a first predetermined frequency to the writer coil;
a laser diode optically coupled to a near-field transducer proximate the writer via an optical waveguide;
a second current source configured to supply a modulated laser current at the first predetermined frequency to the laser diode;
a writer heater proximate the writer and configured to thermally actuate a writer region of the air bearing surface;
a contact sensor proximate the writer coil and configured to sense temperature changes indicative of changes in spacing and contact between the slider and a magnetic recording medium, a signal produced by the contact sensor oscillating at the first predetermined frequency; and
a detector coupled to the contact sensor and configured to detect contact between the thermally actuated writer region and the medium using the contact sensor signal.

9. The apparatus of claim 8, wherein the first predetermined frequency is between about 1 kHz and 5 MHz.

10. The apparatus of claim 8, wherein the first predetermined frequency is between about 5 kHz and 200 kHz.

11. The apparatus of claim 8, wherein the writer current modulation is about 10 percent or less.

12. The apparatus of claim 8, wherein a power supplied to the writer heater is DC power.

13. The apparatus of claim 8, wherein a power supplied to the writer heater is DC power and AC power having a second predetermined frequency in the range of about 0.5 kHz to about 5 kHz.

14. The apparatus of claim 8, wherein the modulated writer current and the modulated laser current cause heating of the contact sensor above a temperature achievable using non-modulated writer and laser current.

15. A method, comprising:
providing relative movement between a magnetic recording medium and a slider configured for heat-assisted magnetic recording, the slider comprising an air bearing surface, a writer including a writer coil, a writer heater, and a contact sensor;
supplying a modulated current at a first predetermined frequency to the writer coil and heating the contact sensor in response to the modulated current;
increasing a power supplied to the writer heater while supplying the modulated current to the writer coil to cause a protruded portion of the air bearing surface to move toward the medium;
producing, by the contact sensor, a sensor signal that oscillates at the first predetermined frequency; and
detecting contact between the protruded portion of the protruded portion of the air bearing surface and the medium using the contact sensor signal.

16. The method of claim 15, wherein the first predetermined frequency is between about 1 kHz and 5 MHz.

17. The method of claim 15, wherein the writer current modulation is about 10 percent or less.

18. The method of claim 15, wherein the power supplied to the writer heater is DC power.

19. The method of claim 15, wherein the power supplied to the writer heater is DC power and AC power having a second predetermined frequency in the range of about 0.5 kHz to about 5 kHz.

20. The method of claim 15, comprising supplying modulated current at the first predetermined frequency to a laser diode optically coupled to a near-field transducer proximate the writer via an optical waveguide, wherein the modulated current supplied to laser diode heats the contact sensor.

* * * * *